United States Patent
Kato et al.

(10) Patent No.: US 8,804,004 B2
(45) Date of Patent: Aug. 12, 2014

(54) IMAGING APPARATUS, IMAGE CONTROL METHOD, AND STORAGE MEDIUM STORING PROGRAM

(75) Inventors: Yoshiyuki Kato, Higashiyamato (JP); Tomohiko Murakami, Musashino (JP); Rie Komiya, Akishima (JP)

(73) Assignee: Casio Computer Co., Ltd., Tokyo (JP)

( * ) Notice: Subject to any disclaimer, the term of this patent is extended or adjusted under 35 U.S.C. 154(b) by 33 days.

(21) Appl. No.: 13/439,374

(22) Filed: Apr. 4, 2012

(65) Prior Publication Data

US 2012/0257082 A1 Oct. 11, 2012

(30) Foreign Application Priority Data

Apr. 7, 2011 (JP) .................. 2011-085422

(51) Int. Cl.
*H04N 5/235* (2006.01)
*H04N 9/73* (2006.01)
*H04N 5/222* (2006.01)

(52) U.S. Cl.
USPC .............. 348/229.1; 348/226.1; 348/333.01

(58) Field of Classification Search
USPC ...................... 348/229.1, 226.1, 333.01
See application file for complete search history.

(56) References Cited

U.S. PATENT DOCUMENTS

| 8,107,002 | B2 | 1/2012 | Kato | |
|---|---|---|---|---|
| 2007/0146501 | A1 | 6/2007 | Matsuoka | |
| 2009/0147122 | A1* | 6/2009 | Kato | 348/333.01 |

FOREIGN PATENT DOCUMENTS

| JP | 9-270950 | A | 10/1997 |
|---|---|---|---|
| JP | 2001-119708 | A | 4/2001 |
| JP | 2002-271683 | A | 9/2002 |
| JP | 2003-163832 | A | 6/2003 |
| JP | 2005-229353 | A | 8/2005 |
| JP | 2007-037103 | A | 2/2007 |
| JP | 2007-174537 | A | 7/2007 |
| JP | 2007-206606 | A | 8/2007 |
| JP | 2007-329604 | A | 12/2007 |
| JP | 2008-011226 | A | 1/2008 |
| JP | 2009-141834 | A | 6/2009 |
| JP | 2009-152919 | A | 7/2009 |
| JP | 2011-254280 | A | 12/2011 |

OTHER PUBLICATIONS

Japanese Office action dated Feb. 26, 2013 (and English translation thereof) in counterpart Japanese Application No. 2011-085422.
Japanese Office Action dated Apr. 16, 2013 (and English translation thereof) in counterpart Japanese Application No. 2011-085422.
Chinese Office Action dated Mar. 11, 2014 (and English translation thereof) in counterpart Chinese Application No. 201210099572.0.

* cited by examiner

*Primary Examiner* — Twyler Haskins
*Assistant Examiner* — Quang Le
(74) *Attorney, Agent, or Firm* — Holtz Holtz Goodman & Chick PC

(57) ABSTRACT

A setting unit selects and sets one of a plurality of commercial power frequencies. A frame rate setting unit sets a frame rate corresponding to the commercial power frequency set by the setting unit. A control unit controls an imaging unit such that imaging is carried out at the frame rate set by the frame rate setting unit to thereby acquire image data successively. A detection unit detects a scanning line part at which luminance changes to differ between image data items successively acquired by the control unit. A changing unit changes the commercial power frequency set by the setting unit in accordance with a detection result obtained by the detection unit.

6 Claims, 13 Drawing Sheets

FIG.3

| CASE | SET FREQUENCY | STANDARD SHUTTER SPEED | DETECTION TARGET FREQUENCY | FRAME RATE | |
|---|---|---|---|---|---|
| | | | | TO 2 SECONDS | MORE THAN 2 SECONDS |
| 1 | 50 Hz | 1/50 s | 60 Hz | 25 fps | 30 fps |
| (1)' | | | | 30 fps | |
| 2 | 60 Hz | 1/60 s | 50 Hz | 30 fps | |

IMAGING APPARATUS, IMAGE CONTROL METHOD, AND STORAGE MEDIUM STORING PROGRAM

CROSS-REFERENCE TO RELATED APPLICATIONS

This application is based upon and claims the benefit of priority from prior Japanese Patent Application No. 2011-085422, filed Apr. 7, 2011, the entire contents of which are incorporated herein by reference.

BACKGROUND OF THE INVENTION

1. Field of the Invention

The present invention relates, in particular, to an imaging apparatus, an image control method, and a storage medium storing program, capable of carrying out imaging in an illumination environment in which a light source driven by commercial power supply is used.

2. Description of the Related Art

As described in, for example, Jpn. Pat. Appln. KOKAI Publication No. 2009-152919, a technique of suppressing the occurrence of a flicker in a moving image to be recorded in an illumination environment in which a light source driven by commercial power supply is used is contrived.

The occurrence of the flicker can be suppressed by coinciding a frequency at which the flicker occurs, and imaging frame rate with each other such that in a power supply environment in which the commercial power frequency is, for example, 50 Hz, the imaging frame rate of the imaging apparatus is set to 50 frames per second and, on the other hand, in a power supply environment in which the commercial power frequency is, for example, 60 Hz, the imaging frame rate of the imaging apparatus is set to 60 frames per second.

It should be noted that, in a general digital camera, drive in which the frame rate for imaging and display is set to 30 frames per second, which is lower than the commercial power frequency, in a live-view display state during imaging standby is carried out.

Accordingly, in an imaging environment in which an AC light source such as a fluorescent light or the like is used at the commercial power frequency of 60 Hz, the frame rate becomes an integral submultiple (1/2) of the commercial power frequency, and there has been a problem that linear noise is displayed as a flicker.

Further, when a high shutter speed is used, such a case of high dynamic range (HDR) image generation in which a panoramic image is mainly generated by continuous-shooting synthesis or an image having a dynamic range enlarged by continuous-shooting synthesis is generated, a recorded image has been affected by a flicker in some cases in imaging at a higher shutter speed than a normal shutter speed.

BRIEF SUMMARY OF THE INVENTION

Accordingly, it is an object of the present invention to provide an imaging apparatus, image control method, and storage medium storing program, capable of suppressing the occurrence of a flicker in an illumination environment in which a light source driven by commercial power supply is used.

According to one aspect of the present invention, there is provided an imaging apparatus comprising: an imaging unit; a setting unit configured to select and set one of a plurality of commercial power frequencies; a frame rate setting unit configured to set a frame rate corresponding to the commercial power frequency set by the setting unit; a control unit configured to control the imaging unit such that imaging is carried out at the frame rate set by the frame rate setting unit to thereby acquire image data successively; a detection unit configured to detect a scanning line part at which luminance changes to differ between image data items successively acquired by the control unit; and a changing unit configured to change the commercial power frequency set by the setting unit in accordance with a detection result obtained by the detection unit.

According to another aspect of the present invention, there is provided an image control method comprising: selecting and setting one of a plurality of commercial power frequencies; setting a frame rate corresponding to the set commercial power frequency; controlling an imaging unit such that imaging is carried out at the set frame rate to thereby acquire image data successively; detecting a scanning line part at which luminance changes to differ between image data items successively acquired; and changing the set commercial power frequency in accordance with a result of the detection.

According to still another aspect of the present invention, there is provided a non-transitory computer-readable storage medium having program code stored thereon for controlling an electronic apparatus equipped with an imaging unit, the program code comprising: selecting and setting one of a plurality of commercial power frequencies; setting a frame rate corresponding to the set commercial power frequency; controlling the imaging unit such that imaging is carried out at the set frame rate to thereby acquire image data successively; detecting a scanning line part at which luminance changes to differ between image data items successively acquired; and changing the set commercial power frequency in accordance with a result of the detection.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 is a view showing the contents of an operation table stored in a program memory according to the first embodiment;

DETAILED DESCRIPTION OF THE INVENTION

Hereinafter, embodiments of the present invention will be described below with reference to the drawings.
First Embodiment Hereinafter, a first embodiment of a case where the present invention is applied to a digital camera will be described with reference to the drawings.

Figure 1:
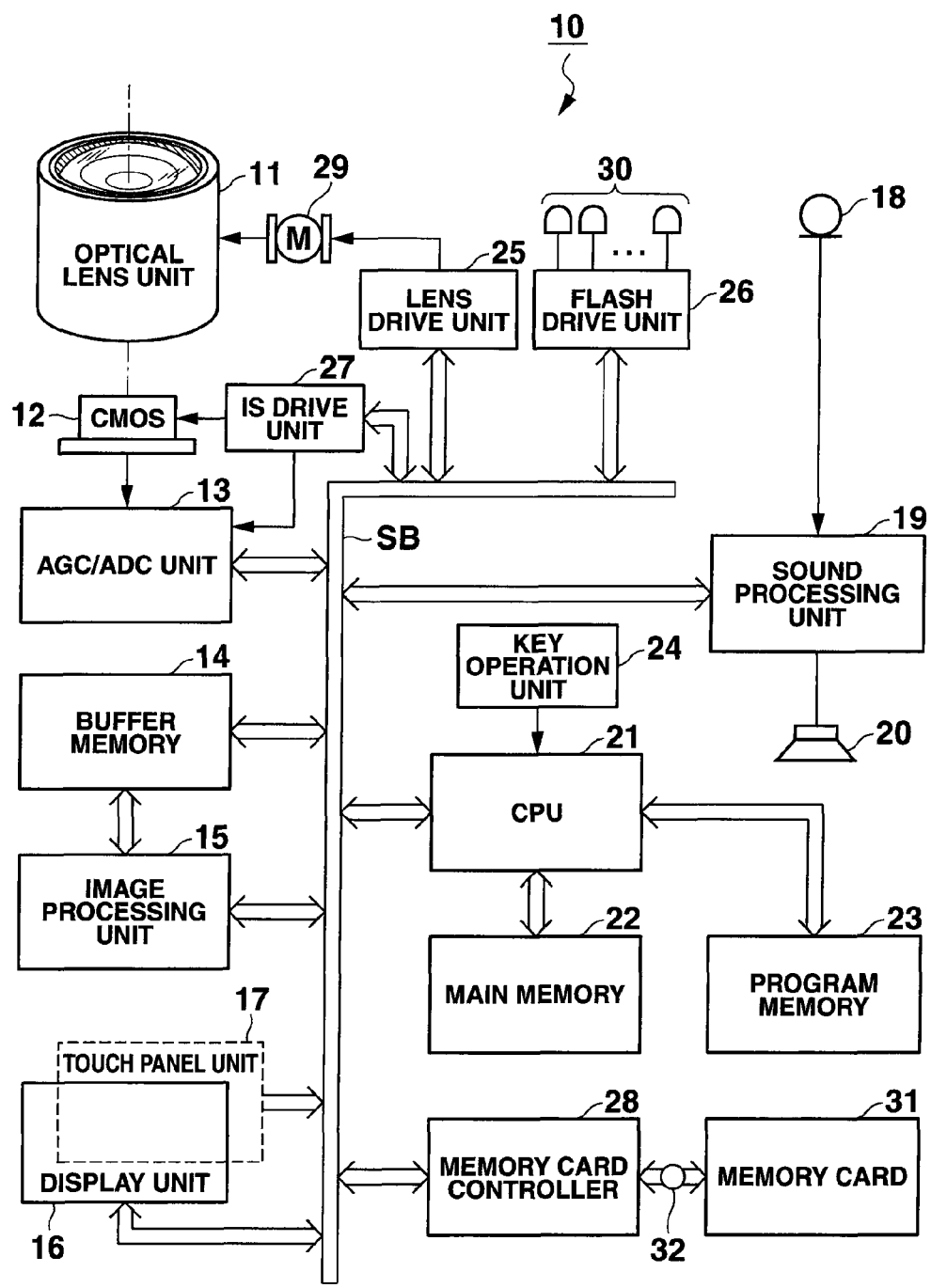
FIG. 1 is a block diagram showing the schematic configuration of a functional circuit of a digital camera according to a first embodiment of the present invention.

FIG. 1 is a view showing the circuit configuration of a digital camera 10 according to this embodiment.

In FIG. 1, a light figure of an object to be imaged is made incident on an imaging area of a solid-state imaging element, for example, a CMOS image sensor 12 through an optical lens unit 11 arranged on a front face of a camera body to thereby be formed thereon as an image.

In the live-view display state, an image signal obtained by the imaging of the CMOS image sensor 12 is subjected to correlated square sampling, automatic gain adjustment (AGC), and analog-to-digital conversion (ADC) in an AGC/ADC unit 13 to thereby be digitized. The image data of the digital value is sent to a buffer memory 14 through a system bus SB, and is held in the buffer memory 14.

An image processing unit 15 appropriately subjects the image data held in the buffer memory 14 to necessary image processing. The buffer memory 14 has a capacity of holding image data of at least two frames.

In the image processing unit 15, the image data (hereinafter referred to as "raw data") held in the buffer memory 14, and corresponding to the configuration of a color filter of the Bayer arrangement possessed by the CMOS image sensor 12 is subjected to digital development processing, more specifically, to de-mosaicking operation such as pixel interpolation processing, gamma correction processing, matrix operation, and the like to thereby be converted into image data of a luminance color difference system (YUV).

The image processing unit 15 creates image data obtained by largely reducing the number of pixels and gradation from image data after development, and sends the image data to a display unit 16 through the system bus SB. In the display unit 16, the image data sent thereto is live-view-displayed.

The display unit 16 is constituted of, for example, a color liquid crystal panel with backlight, and controller thereof. A touch panel unit 17 using a transparent conductive film is configured at an upper part of the screen of the display unit in an integrating manner.

When the user touch-operates the surface of the touch panel unit 17 with his or her finger or the like, the touch panel unit 17 calculates a position of the operation coordinates, and transmits a calculated coordinate signal to a CPU 21 to be described later through the system bus SB.

Further, like the optical lens unit 11 described above, a microphone 18 is arranged on the front face of the camera body, and a sound in the direction of the object to be imaged is input thereto. The microphone 18 converts the input sound into an electric signal, and outputs the signal to a sound processing unit 19.

The sound processing unit 19 converts the sound signal input thereto from the microphone 18 into digital data when recording sound only, when imaging a still image with sound, and when imaging a moving image. Furthermore, the sound processing unit 19 detects the sound pressure level of the digitized sound data and, on the other hand, subjects the sound data to data compression in a format of, for example, Moving Picture Experts Group 4 Advanced Audio Coding (AAC) to create a sound data file, and transmits the sound data file to a recording medium to be described later.

Moreover, the sound processing unit 19 is provided with a sound source circuit such as a PCM sound source or the like, converts the sound data file transmitted thereto during reproduction of the sound into analog data by uncompressing the sound data file, and drives a speaker 20 provided on the rear side of the body of the digital camera 10 to output sound from the speaker 20.

A CPU 21 controls the circuits described above in a unifying manner. The CPU 21 is directly connected to a main memory 22 and program memory 23. The main memory 22 is constituted of, for example, an SRAM, and functions as a work memory. The program memory 23 is constituted of, for example, an electrically rewritable nonvolatile memory such as a flash memory or the like, and fixedly stores therein various operation programs including live-view display processing to be described later, data, and the like.

The CPU 21 reads a necessary program, data or the like from the program memory 23, and executes a control operation of the whole digital camera 10 while appropriately and temporarily spread-storing the read program or data in the main memory 22.

Furthermore, the CPU 21 executes a control operation in accordance with various key operation signals directly input thereto from a key operation unit 24 or a coordinate signal corresponding to a touch operation of the touch panel unit 17.

The key operation unit 24 is provided with, for example, a power supply key, shutter release key for still image imaging, "REC" key for imaging of a dynamic image, zoom-up/down key, imaging mode key, reproduction mode key, menu key, cursor moving key, set key, release key, display key, and the like.

The CPU 21 is connected, through the system bus SB, to the AGC/ADC unit 13, buffer memory 14, image processing unit 15, display unit 16, touch panel unit 17, and sound processing unit 19 and, furthermore to a lens drive unit 25, flash drive unit 26, image sensor (IS) drive unit 27, and memory card controller 28.

The lens drive unit 25 receives a control signal from the CPU 21 to control rotation of a lens DC motor (M) 29, controls part of a plurality of lens groups constituting the lens unit 11 and, more specifically, controls each of positions of a zoom lens and focus lens, and aperture ratio of the stop separately from each other.

The flash drive unit 26 receives, while imaging a still image, a control signal from the CPU 21 to lighting-drive a flash unit 30 constituted of a plurality of white high-luminance LEDs in synchronism with the imaging timing.

The image sensor drive unit 27 carries out scanning-drive of the CMOS image sensor 12 in accordance with the imaging conditions and the like set at that point in time.

The image processing unit 15 subjects, when imaging an image concomitant with a shutter release key operation of the key operation unit 24, the image data sent from the AGC/ADC unit 13 and held in the buffer memory 14 to de-mosaicking processing and, subjects, when the image data conforms to a predetermined data file format, for example, joint photographic experts group (JPEG), the image data to data compression processing such as discrete cosine transform (DCT), Huffman coding or the like to thereby create an image data file a data amount of which is largely reduced. The created image data file is recorded on a memory card 31 through the system bus SB, and memory card controller 28.

Further, the image processing unit 15 receives, through the system bus, image data read from the memory card 31 through the memory card controller 28 during a reproduction mode, makes the buffer memory 14 hold the read image data, obtains image data of an original size by subjecting the image data held in the buffer memory 14 to expansion (uncompression) processing by a procedure the reverse of that when recording, reduces the amount of data of the obtained image data and, thereafter makes the display unit 16 display the image data through the system bus SB.

The memory card controller 28 is connected to the memory card 31 through a card connector 32. The memory card 31 is detachably attached to the digital camera 10, is a recording memory serving as a recording medium of the digital camera 10 and, inside the memory card 31, a flash memory which is a nonvolatile memory, and drive circuit of the flash memory are provided.

Next, operations of the above-mentioned embodiment will be described below.

It should be noted that the operations shown below show the processing contents which the CPU 21 executes in order to carry out live-view display in the imaging mode for imaging a still image in an extracting manner separately from the processing for the shutter key operation. Regarding the processing contents, the CPU 21 reads an operation program and data stored in the program memory 23, spread-stores the read operation program and data in the main memory 22 and, thereafter executes the operation program.

The operation program and the like stored in the program memory 23 include, in addition to those stored in the program memory 23 prior to shipping the digital camera 10 from the factory, a new operation program, data, and the like downloaded from outside by connecting the digital camera 10 to the personal computer when, for example, upgrading the digital camera 10.

Figure 2:
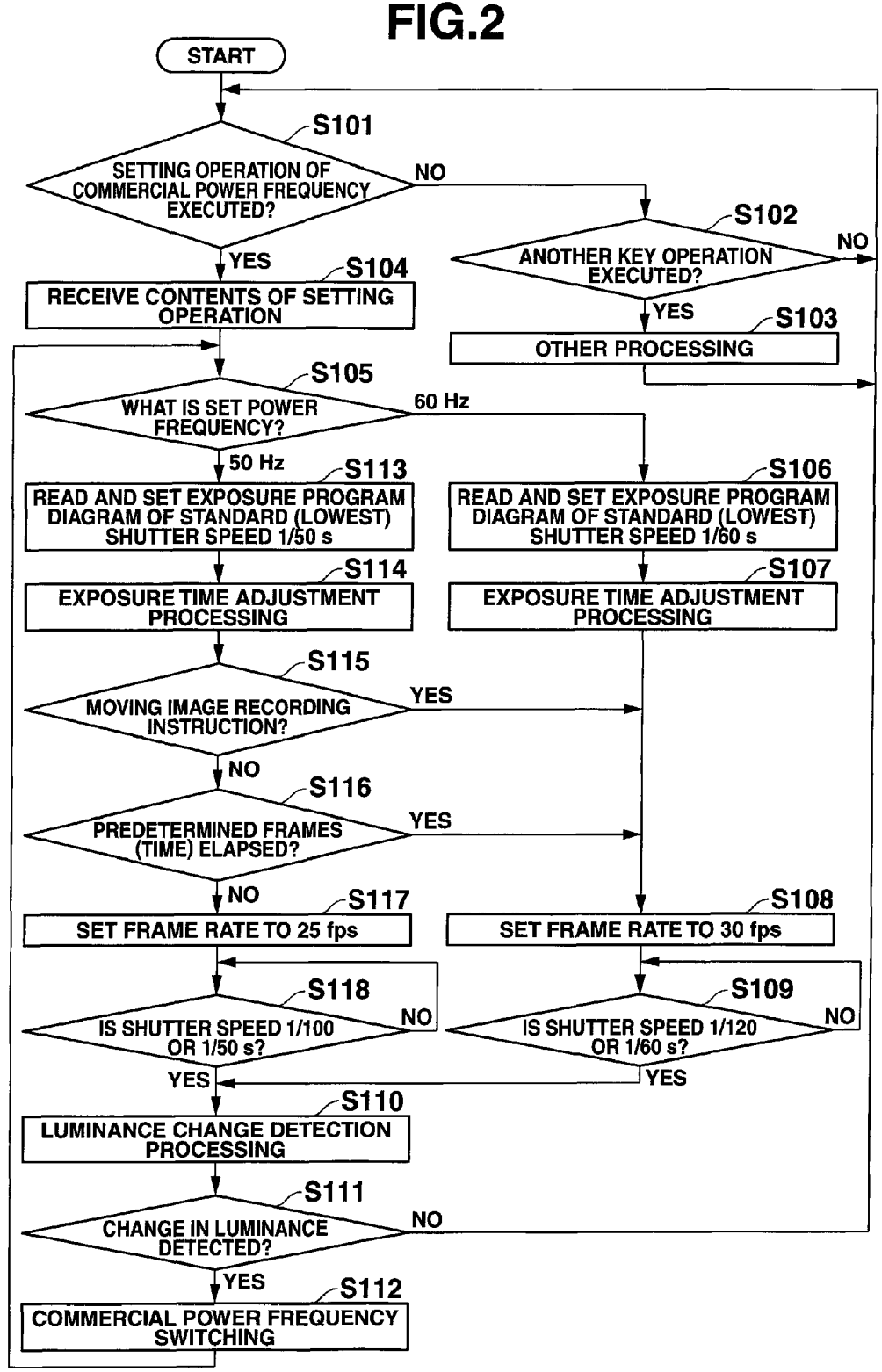
FIG. 2 is a flowchart showing the processing contents associated with live-view display in a still image imaging mode according to the first embodiment.

FIG. 2 shows, as described above, the processing contents to be carried out from the starting of the still image imaging mode to the live-view display.

It should be noted that it is assumed that information about the commercial power frequency set last time, more specifically, information for recognizing whether the commercial power frequency is 50 or 60 Hz is included in part of last memory information of the program memory 23.

At the beginning of the processing, the CPU 21 determines whether or not a setting operation of the commercial power frequency has been carried out (step S101). The determination of the setting operation includes a case where information about the commercial power frequency exists in the last memory information read from the program memory 23 immediately after turning on of the power supply in the imaging mode.

When it is determined in step S101 that a setting operation of the commercial power frequency has not been carried out, the CPU 21 further determines whether or not some other key operation has been carried out by using the key operation unit 24 (step S102). When it is determined in step S102 that no other key operation has been carried out, the CPU 21 returns to the processing from step S101 as it is.

By repetitively executing the processing of steps S101 and S102 in this manner, the CPU 21 waits for the setting operation of the commercial power frequency or some other key operation to be carried out.

When some other key operation has been carried out, the CPU 21 determines the fact in step S102, executes processing corresponding to the contents of the operated key (step S103) and, thereafter returns to the processing from step S101 again.

When a setting operation of the commercial power frequency including the operation of turning on of the power of the digital camera 10, and automatically reading the last memory information as the initial setting which are operations to be carried out as processing at the beginning of the operations has been carried out, the CPU 21 determines the fact in step S101, and then receives the contents of the setting operation (step S104).

Subsequently, the CPU 21 determines the received contents, i.e., whether the set commercial power frequency has been 50 or 60 Hz (step S105).

Here, when the commercial power frequency has been 60 Hz, the CPU 21 reads and sets information of the exposure program diagram in which the standard shutter speed is 1/60 s in accordance with the operation table stored in the program memory 23 (step S106).

FIG. 3 shows an example of an operation table stored in the program memory 23. As shown in FIG. 3, in the case "2" in which the set frequency is 60 Hz, the minimum standard shutter speed is set to 1/60 s, and the commercial power frequency which is the object of flicker detection is set to 50 Hz.

Accordingly, when the open aperture value of the optical lens unit 11 is, for example, 2.8 (F=2.8), the CPU 21 sets the shutter speed to 1/60 s in the range below 8 of the EV value, and increases the sensitivity as the need arises.

Further, when the EV value becomes greater than 8, the CPU 21 reads information of the exposure program diagram configured to shift the shutter speed toward the higher speed side correspondingly from the program memory 23, stores the read information in the main memory 22 and, thereafter causes the lens drive unit 25, and lens DC motor 29 to control the aperture value F of the optical lens unit 11 after that in accordance with the contents of the stored information, and causes the image sensor drive unit 27 to control the shutter speed at the CMOS image sensor 12.

Thereafter, furthermore, the CPU 21 carries out exposure time adjustment processing configured to fix the shutter speed to one of 1/120 and 1/60 s synchronous with the imaging frame rate, and display frame rate of the display unit 16 (step S107).

Subsequently, the CPU 21 carries out imaging by using the CMOS image sensor 12, and sets the display frame rate of the display unit 16 to 30 frames per second (step S108).

After carrying out the setting described above, the CPU 21 waits for the shutter speed at the CMOS image sensor 12 to actually become one of 1/120 and 1/60 s synchronous with the imaging frame rate (step S109).

Further, at the point in time at which the shutter speed has become one of 1/120 and 1/60 s, the CPU 21 determines the fact in step S109, holds the data in the buffer memory 14 at that point of time, and carries out, with respect to the image data displayed on the display unit 16, detection processing of detecting whether or not a change in luminance has been detected, more specifically, detection processing of detecting whether or not the linear noise resulting from a difference in luminance has occurred (step S110).

Figure 4:
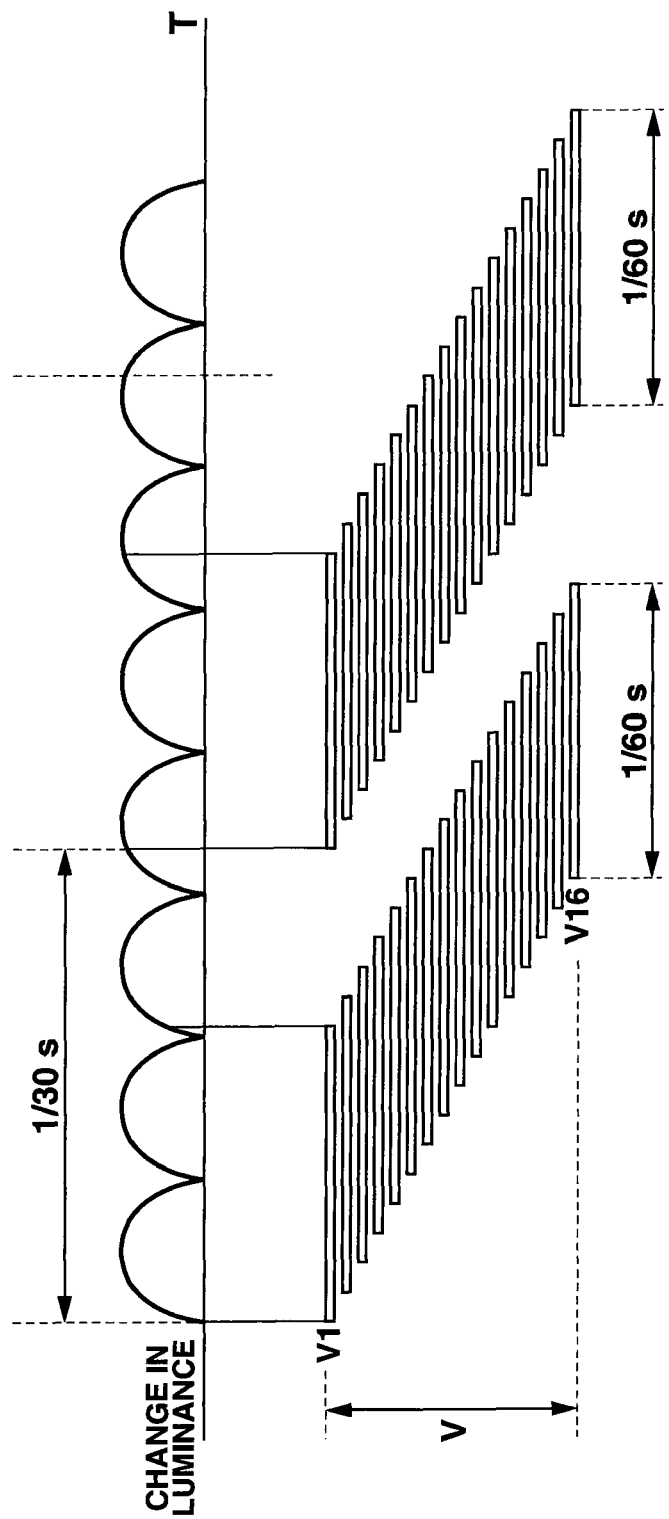
FIG. 4 is a view showing an imaging operation to be carried out when a shutter speed is set to 1/60 s, and a frame rate is set to 30 frames per second in an illumination environment in which an AC light source of 50 Hz is used according to the first embodiment.

FIG. 4 exemplifies an operation state of a case where the shutter speed is set to 1/60 s, and the frame rate is set to 30 frames per second in the illumination environment in which the light source is driven by the commercial power frequency of 50 Hz.

In FIG. 4, in order to show the operation of the CMOS image sensor 12 in a simplified manner, it is assumed that the number of the vertical transfer lines (hereinafter referred to as "V lines") of the CMOS image sensor 12 is in total 16 lines of V1 to V16.

As shown in FIG. 4, in the CMOS image sensor 12, the exposure timing for each V line is progressively shifted from line to line. By comparing a change in luminance for each of the V lines between frames, i.e., by comparing the luminance at one position of the V lines with that of the preceding frame at the same position, it is possible to determine whether or not the linear noise has occurred at the line position.

In a compact type of digital camera or the like, when live-view display is carried out with the display frame rate set to 30 frames per second in the illumination environment in which the light source is assumed to be driven by the commercial power supply having the frequency of 60 Hz as described above, if the actual illumination light source is driven by 50 Hz, the above-mentioned linear noise occurs, and the noise can be detected as a change in luminance occurring in units of lines, i.e., as a flicker.

The flicker occurs when a predetermined condition is satisfied in the relationship between the commercial power frequency and frame rate and, in Japan, when, for example, a digital camera which has been set and used in the western part of Japan, such as Osaka or the like, is used in the eastern part of Japan, such as Tokyo or the like, without changing the setting, the flicker occurs at the beginning of the live-view display.

As a result of the detection processing carried out in step S110, it is determined whether or not a change in luminance has been detected (step S111). Here, when a change in luminance cannot be detected, the flow is returned to the processing from step S101 again in order to repetitively execute the same operations.

Further, when it is determined in step S111 that a change in luminance has been detected, a setting operation of switching the commercial power frequency from 60 Hz which has hitherto been set to 50 Hz is carried out (step S112) and, thereafter the flow is returned to the processing from step S105 again.

Further, when it is determined in step S105 that the set commercial power frequency has been 50 Hz, the CPU 21 reads and sets information of the exposure program diagram in which the standard shutter speed is 1/50 s in accordance with the operation table stored in the program memory 23 (step S113).

In the operation table of FIG. 3, in the case "1" in which the frequency is 50 Hz, the standard shutter speed which is the minimum value is set to 1/50 s, and the commercial power frequency which is the object to be detected is set to 60 Hz.

When the open aperture value of the optical lens unit 11 is, for example, 2.8 (F=2.8), the CPU 21 sets the shutter speed to 1/50 s in the range below 7.7 of the EV value, and increases the sensitivity as the need arises.

Further, when the EV value becomes greater than 7.7, the CPU 21 reads information of the exposure program diagram configured to shift the shutter speed toward the higher speed side correspondingly from the program memory 23, stores the read information in the main memory 22 and, thereafter causes the lens drive unit 25, and lens DC motor 29 to control the aperture value F of the optical lens unit 11 after that in accordance with the contents of the stored information, and causes the image sensor drive unit 27 to control the shutter speed at the CMOS image sensor 12.

Thereafter, furthermore, the CPU 21 carries out exposure time adjustment processing configured to set the shutter speed to one of 1/100 and 1/50 s synchronous with the imaging frame rate, and display frame rate (step S114).

Moreover, the CPU 21 determines whether or not the mode has been switched from the still image imaging preparation state which has hitherto been set to the moving image imaging preparation, i.e., the moving image imaging/recording instruction (step S115).

Here, when it is determined that the mode has not been switched to the moving image recording instruction, the CPU 21 further determines whether or not the operation state identical to the current point in time has captured the number of frames corresponding to a predetermined time, for example, 50 frames corresponding to 2 s (step S116).

Here, when it is determined that the predetermined time has not elapsed, the CPU 21 carries out imaging by using the CMOS image sensor 12, and sets the display frame rate to 25 frames per second (step S117).

After carrying out the above setting, the CPU 21 waits for the shutter speed at the CMOS image sensor 12 to actually become one of 1/100 and 1/50 s synchronous with the frame rate of the imaging system (step S118).

Further, at the point in time at which the shutter speed has become one of 1/100 and 1/50 s, the CPU 21 determines the fact in step S118, holds the data in the buffer memory 14 at the point in time, and carries out detection processing of determining whether or not a change in luminance has been detected with respect to the image data displayed on the display unit 16 (step S110).

Figure 5:
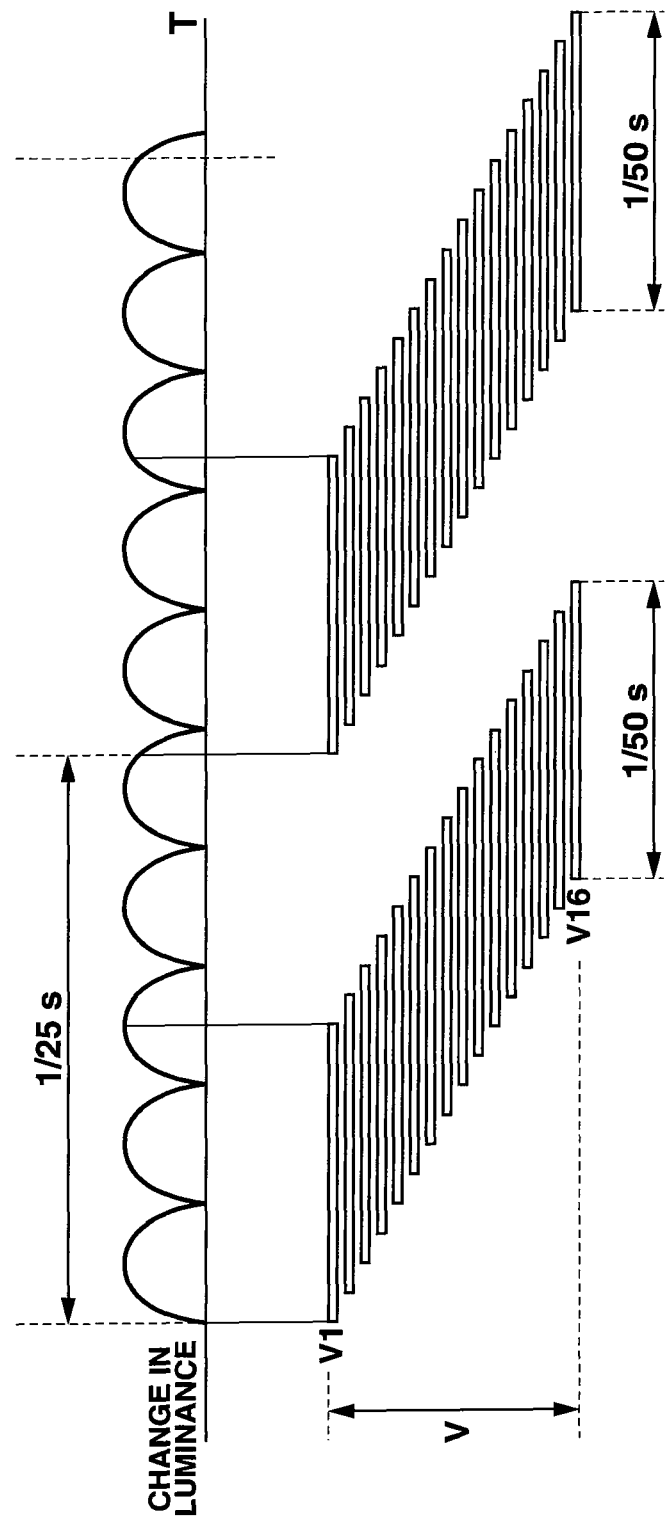
FIG. 5 is a view showing an imaging operation to be carried out when a shutter speed is set to 1/50 s, and a frame rate is set to 25 frames per second in an illumination environment in which an AC light source of 60 Hz is used according to the first embodiment.

FIG. 5 exemplifies an operation state of a case where the shutter speed is set to 1/50 s, and the frame rate is set to 25 frames per second in the illumination environment in which the light source is driven by the commercial power frequency 60 Hz.

Further, as in the case of FIG. 4, it is assumed that the number of the V lines of the CMOS image sensor 12 is in total 16 lines of V1 to V16.

As shown in FIG. 5, in the CMOS image sensor 12, the exposure timing for each V line is progressively shifted from line to line. By comparing a change in luminance for each of the V lines between frames, it is possible to determine whether or not the noise has occurred at the line position.

As a result of the detection processing carried out in step S109, it is determined whether or not a change in luminance has been detected (step S111). Here, when a change in luminance cannot be detected, the flow is returned to the processing from step S101 again in order to repetitively execute the same operations.

Further, when it is determined in step S111 that a change in luminance has been detected, the commercial power frequency is switched from 50 Hz which has hitherto been set to 60 Hz (step S112) and, then the flow is returned to the processing from step S105 again.

Further, when it is determined in step S115 that the mode has been switched to the moving image recording instruction or when it is determined in step S116 that the operation state identical to the current point in time has captured the number of frames corresponding to a predetermined time, for example, 50 frames corresponding to 2 s, 25 frames per second is canceled with respect to the display frame rate, the flow is advanced to step S108, and the display frame rate is newly set to 30 frames per second.

That is, when it is determined in step S115 that the mode has been switched to the moving image recording instruction, the display frame rate is set to 30 frames per second which is the standard during moving image imaging as a display frame rate having a high affinity for a video signal of the NTSC system.

On the other hand, when it is determined in step S116 that a predetermined time has elapsed in the state where noise is not detected at the display frame rate of 25 frames per second, then it is further determined that the above-mentioned detection processing in that imaging environment is unnecessary, and the display frame rate is set to 30 frames per second.

Figure 6:
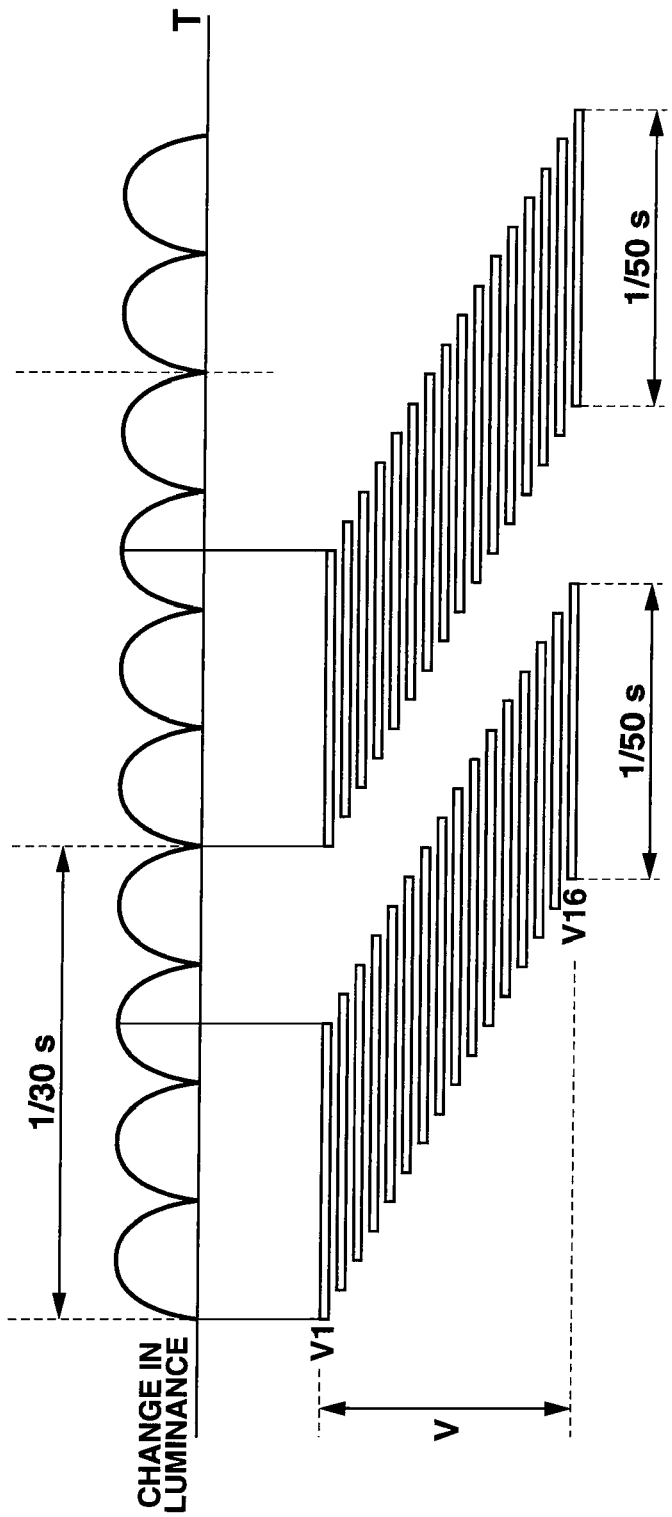
FIG. 6 is a view showing an imaging operation to be carried out when a shutter speed is set to 1/50 s, and a frame rate is set to 30 frames per second in an illumination environment in which an AC light source of 60 Hz is used according to the first embodiment.

FIG. 6 exemplifies an operation state of a case where the shutter speed is set to 1/50 s, and the frame rate is set to 30 frames per second in the illumination environment in which the light source is driven by the commercial power frequency 60 Hz.

Further, as in the cases of FIG. 4 and FIG. 5, it is assumed that the number of the V lines of the CMOS image sensor 12 is in total 16 lines of V1 to V16.

As shown in FIG. 6, in the CMOS image sensor 12, the exposure timing for each V line is progressively shifted from line to line.

When live-view display is carried out assuming that the light source is driven by the commercial power frequency of 60 Hz, and the display frame rate is set to 30 frames per second in the above-mentioned illumination environment as shown in FIG. 6, the display frame rate becomes a divisor of the commercial power frequency, and it is difficult to detect a change in luminance even when a change in luminance for each of the V lines is compared between frames.

However, when the frame rate is set to 30 frames per second for the purpose of moving image imaging as described above or when the frame rate is set to 30 frames per second because a change in luminance has not been detectable for a given time by setting the frame rate to 25 frames per second, flicker noise occurs only in the imaging preparation state where live-view display is carried out, and hence the user does not recognize the noise as deteriorated display image quality.

As has been described above in detail, according to this embodiment, it becomes possible to almost completely suppress the occurrence of linear noise in the monitor image in an imaging environment in which an AC light source is used.

Further, in this embodiment described above, at the point in time at which it is instructed to prepare for moving image imaging, the frame rate is returned to the standard frame rate of 30 frames per second even when the set commercial power frequency is 50 Hz, and hence processing to be carried out thereafter when starting moving image imaging is reduced, and it is possible to immediately shift to starting moving image recording.

Second Embodiment

Hereinafter, a second embodiment of a case where the present invention is applied to a digital camera will be described with reference to the drawings.

This second embodiment is contrived for the purpose of eliminating, to the utmost, an influence of a flicker due to imaging at a faster shutter speed than a normal shutter speed in a case where a higher shutter speed is used, such as a case of high dynamic range (HDR) image generation or the like in which a panoramic image is mainly generated by continuous-shooting synthesis or an image having a dynamic range enlarged by continuous-shooting synthesis is generated.

It should be noted that the circuit configuration of the digital camera itself according to this embodiment is basically identical to the digital camera 10 described in connection with FIG. 1, and hence identical parts are denoted by identical reference symbols, and their illustration and description will be omitted.

Further, in this embodiment, it is assumed that a buffer memory 14 has the capacity capable of holding image data corresponding to at least five frames.

Next, operations of the embodiment will be described below.

It should be noted that operations shown below show the processing contents executed by a CPU 21 in order to carry out live-view display in an imaging mode for imaging a moving image or a still image, and the CPU 21 reads an operation program and data stored in the program memory 23, spreads and stores the read program and data in the main memory 22, and thereafter executes the operation program.

The operation program and the like stored in the program memory 23 include, in addition to those stored in the program memory 23 prior to shipping the digital camera 10 from the factory, a new operation program, data, and the like downloaded from outside by connecting the digital camera 10 to a personal computer at when, for example, upgrading the digital camera 10.

Figure 7:
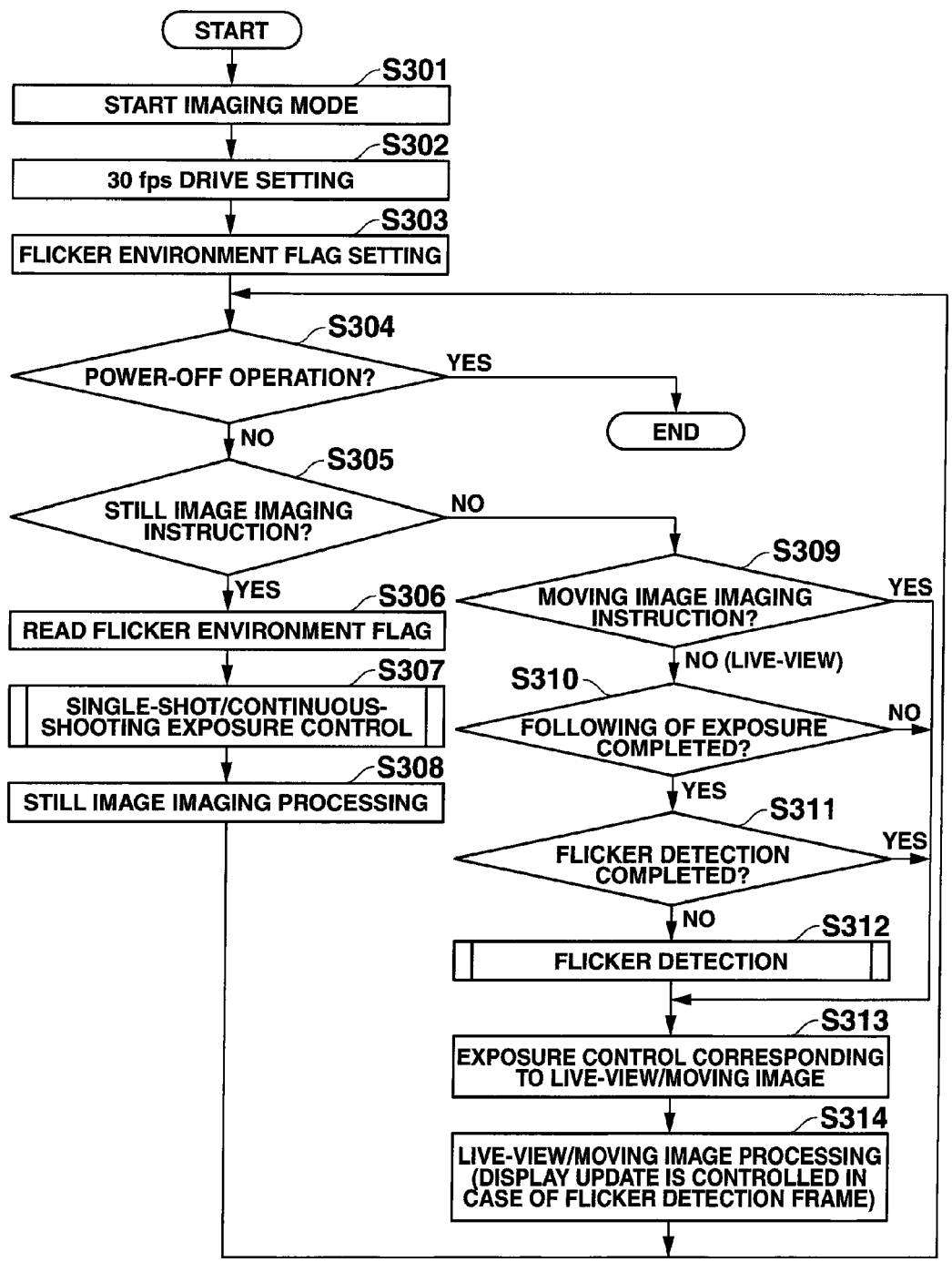
FIG. 7 is a flowchart showing the processing during an imaging mode according to a second embodiment of the present invention.
Figure 8:
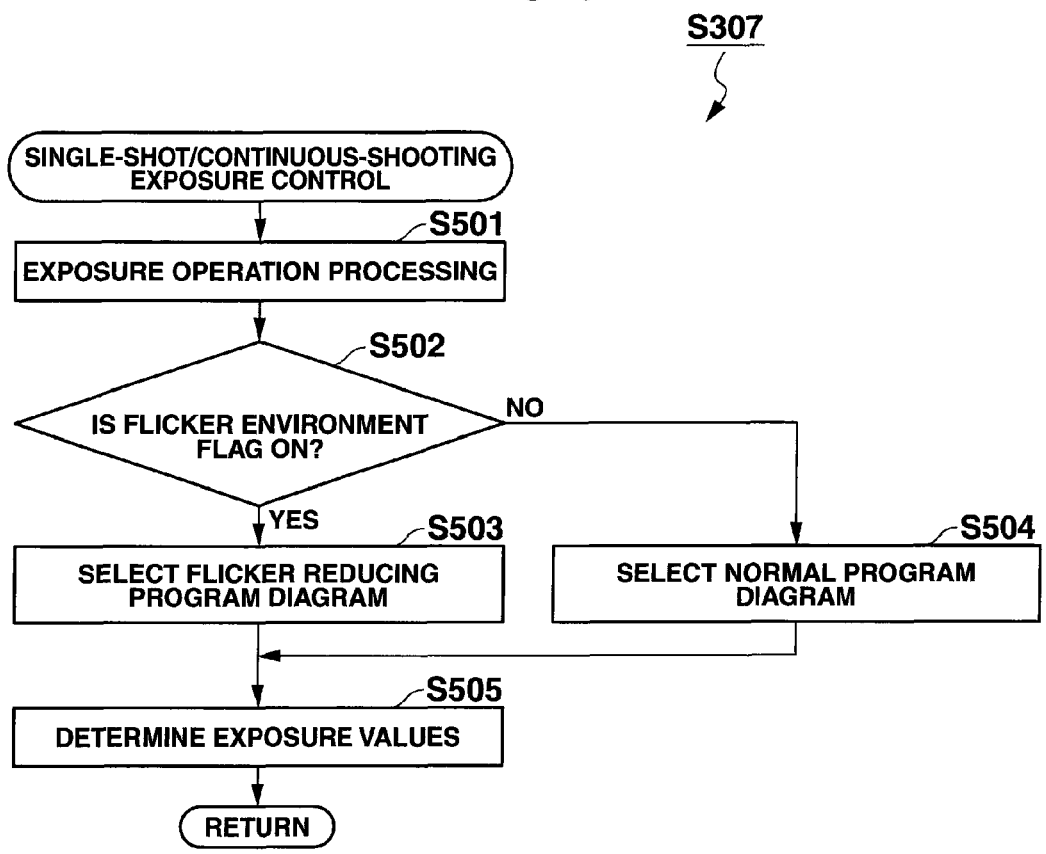
FIG. 8 is a flowchart showing the processing contents of a subroutine of single-shot/continuous-shooting exposure control of step S307 of FIG. 7 according to the second embodiment.
Figure 9:
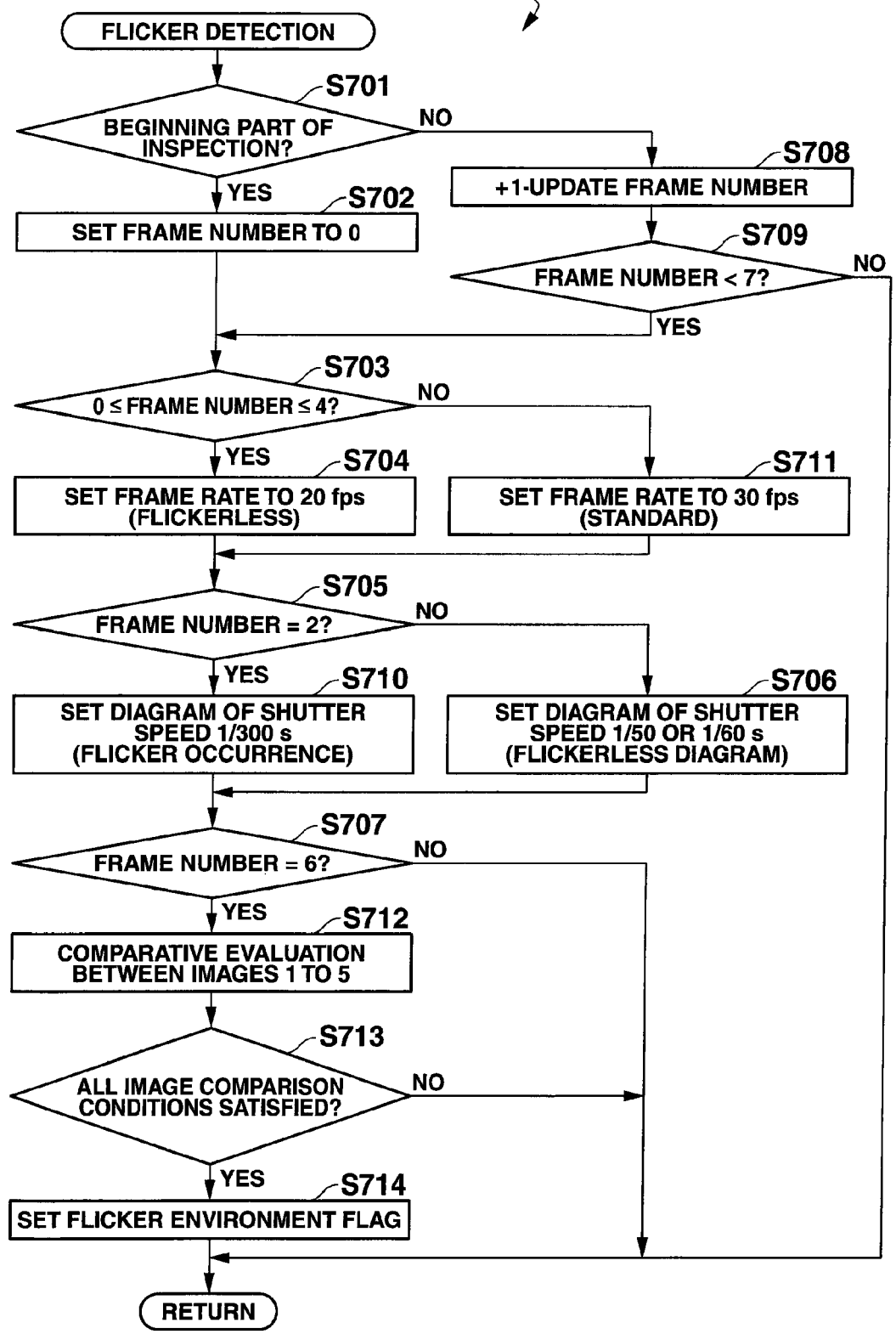
FIG. 9 is a flowchart showing the processing contents of a subroutine of flicker detection processing of step S312 of FIG. 7 according to the second embodiment.

FIGS. 7 to 9 show the processing contents of a case where the imaging mode is started, and imaging of a moving image or a still image is executed while live-view display is carried out.

The CPU 21 starts the imaging mode concomitantly with the power-on operation (step S301), and first sets 30 frames per second as the display frame rate of the live view (step S302).

Furthermore, the CPU 21 resets a flicker environment flag register provided in the main memory 22 (step S303). The processing of above steps S301 to S303 is the initial setting during imaging mode concomitant with the power-on operation.

Subsequently, the CPU 21 confirms that the power-off operation has not been carried out (step S304), and thereafter determines whether or not a shutter release key of the key operation unit 24 for still image imaging has been operated (step S305).

Here, when it is determined that the shutter release key has not been operated, and it is not instructed to start imaging of a still image, the CPU 21 subsequently determines whether or not a "REC" key of the key operation unit 24 for moving image imaging has been operated (step S309).

When it is determined that the "REC" key has not been operated, and it has not been instructed to start imaging of a moving image, the CPU 21 considers that live-view display is to be carried out, and first determines whether or not following of exposure has been completed (step S310).

When it is determined following of exposure has not been completed, the CPU 21 omits the processing of flicker detection, and executes exposure control corresponding to each of the case of live-view display and the case of moving image imaging (step S313).

At this time, on the basis of information stored in part of the last memory information indicating which one of 50 and 60 Hz of the commercial power frequency is selected, the CPU 21 maintains, as much as possible, the shutter speed which makes the exposure time 1/50 and 1/100 s or 1/60 and 1/120 s, and synchronizes the blinking period of the light source, and capturing period of the CMOS image sensor 12 serving as the imaging element with each other.

By the processing of the CPU 21, it is possible to sufficiently reduce the flickering occurring in the image displayed on the display unit 16, and make the image in the live view an image of high quality. Thereafter, the CPU 21 causes live-view display of the image acquired by the CMOS image sensor 12 to be executed (step S314), whereby the CPU 21 makes following of exposure to be completed, and returns to the processing from step S304 again.

Subsequently, having determined in step S309 that the "REC" key has not been operated on the basis of the processing of steps S304, and S305, the CPU 21 confirms in subsequent step S310 that following of exposure has been completed, and then determines whether or not the processing of flicker detection has been completed (step S311).

Here, when it is determined that the processing of flicker detection has not been completed, the CPU 21 newly executes the processing of flicker detection (step S312).

FIG. 9 is a flowchart of a subroutine showing the details of the flicker detection processing to be repetitively executed by the CPU 21 when it is determined that the flicker detection processing has not been completed.

At the beginning of the processing, the CPU 21 determines whether or not this part is a beginning part of the inspection (step S701). Here, when it is determined that the part is at the beginning of the inspection, the CPU 21 sets an initial value "0" as the frame number (Step S702).

Thereafter, the CPU 21 determines whether or not the frame number is within the range of "0" to "4" (step S703), and having determined that the frame number is within the range of "0" to "4", the CPU 21 temporarily sets the display frame rate in the live view to 20 frames per second (step S704).

This frame rate of 20 frames per second becomes a common divisor of periods of amplitude 100 and 120 Hz of both of a case where the commercial power frequency is 50 Hz, and a case where the commercial power frequency is 60 Hz, and is hence set as a value achieving synchronization for each of the commercial power frequencies of 50 and 60 Hz, and as an optimum value in an environment in which comparison between frames is carried out.

Thereafter, the CPU 21 determines whether or not the frame number is "2" (step S705). Having determined that the frame number is not "2", the CPU 21 selects and sets a program diagram which maintains the shutter speed 1/50 or 1/60 s during image acquisition as much as possible such that the commercial power frequency and period are synchronized with each other (step S706). These processing items are carried out by the CPU 21 for the purpose of eliminating occurrence of a flicker irrespectively of the commercial power frequency environment.

Thereafter, the CPU 21 determines whether or not the frame number is "6" (step S707) and, having determined that the frame number is not "6", the CPU 21 temporarily terminates the processing of FIG. 9, returns to the original main routine of FIG. 7, and acquires an image based on the above exposure setting by the processing of steps S313, and S314.

In the main routine of FIG. 7, at the beginning of power-on for carrying out live-view display, processing in which flicker detection processing is executed in step S311 through steps S304, S305, S309, and S310, and an image as set by the exposure setting is acquired in steps S313, and S314 is repetitively executed.

Hereinafter, the flicker detection processing to be continuously executed will be described below along the flow.

In FIG. 9, having determined in step S701 at the beginning that the part is not at the beginning of the inspection, the CPU 21 "+1"-update-sets the frame number at that point in time to make it "1" (step S708), and further confirms that the update-set frame number is less than "7" (step S709).

When the frame number becomes "1", the CPU 21 confirms in next step S703 that the frame number is within the range of "0" to "4", and thereafter in subsequent step S704 maintains the setting of the frame rate 20 frames per second.

Furthermore, the CPU 21 confirms in next step S705 that the frame number is not "2" and, in subsequent step S706, the CPU 21 selects and sets a program diagram which maintains the shutter speed 1/50 or 1/60 s during image acquisition as much as possible.

Thereafter, the CPU 21 confirms that the frame number is not "6" to temporarily terminate the processing of FIG. 9, and acquires an image based on the above-mentioned exposure setting by the processing of steps S313 and S314.

In the third processing of FIG. 9, having determined in step S701 at the beginning that the part is not at the beginning of the inspection, the CPU 21 "+1"-update-sets the frame number at that point in time to make it "2" in step S708 and, thereafter confirms in step S709 that the update-set frame number is less than "7".

When the frame number becomes "2", the CPU 21 confirms in next step S703 that the frame number is within the range of "0" to "4" and, thereafter in subsequent step S704 maintains the setting of the frame rate 20 frames per second.

Furthermore, having determined in next step S705 that the frame number is "2", the CPU 21 selects and sets a program diagram which provides high shutter speeds the lowest (the time during which the shutter is opened is the longest) shutter speed of which maintains 1/300 s in order to intentionally cause a flicker (step S710).

At this time, when it is determined that insufficiency of the amount of light will be caused by setting the shutter speeds to high speeds, the problem is dealt with by increasing the ISO sensitivity, i.e., by increasing the amplification factor of AGC at the AGC/ADC unit 13, and the obtained brightness is corrected to be equalized.

Thereafter, the CPU 21 confirms that the frame number is not "6" to temporarily terminate the processing of FIG. 9, and acquires an image based on the above exposure setting by the processing of steps S313 and S314.

At this time, when live-view display is carried out in step S314, setting of intentionally causing a flicker has been carried out, and hence update of display on the display unit 16 is not carried out as shown in FIG. 10(D), and display based on the image acquired at the preceding timing, and held in the buffer memory 14 is continuously carried out.

As described above, display of an image which obviously seems to cause a flicker is avoided, and the most recent display state is maintained, and hence it is possible to execute the processing of flicker detection without giving discomfort to the user.

Having determined in the fourth processing of FIG. 9 that the part is not at the beginning of the inspection in beginning step S701, the CPU 21 "+1"-update-sets the frame number at that point in time to make it "3" in step S708 and, thereafter confirms in step S709 that the update-set frame number is less than "7".

When the frame number becomes "3", the CPU 21 confirms in next step S703 that the frame number is within the range of "0" to "4" and, thereafter in subsequent step S704 maintains the setting of the frame rate 20 frames per second.

Furthermore, the CPU 21 confirms in next step S705 that the frame number is not "2" and, selects and sets, in subsequent step S706, a program diagram which maintains the shutter speed 1/50 or 1/60 s during image acquisition as much as possible.

Thereafter, the CPU 21 confirms that the frame number is not "6" to temporarily terminate the processing of FIG. 9, and acquires an image based on the above exposure setting by the processing of steps S313, and S314.

Having determined in the fifth processing of FIG. 9 that the part is not at the beginning of the inspection in beginning step S701, the CPU 21 "+1"-update-sets the frame number at that point in time to make it "4" in step S708 and, thereafter confirms in step S709 that the update-set frame number is less than "7".

When the frame number becomes "4", the CPU 21 confirms in next step S703 that the frame number is within the range of "0" to "4" and, thereafter in subsequent step S704 maintains the setting of the frame rate 20 frames per second.

Furthermore, the CPU 21 confirms in next step S705 that the frame number is not "2" and, selects and sets, in subsequent step S706, a program diagram which maintains the shutter speed 1/50 or 1/60 s during image acquisition as much as possible.

Thereafter, the CPU 21 confirms that the frame number is not "6" to temporarily terminate the processing of FIG. 9, and acquires an image based on the above exposure setting by the processing of steps S313, and S314.

Having determined in the sixth processing of FIG. 9 that the part is not at the beginning of the inspection in beginning step S701, the CPU 21 "+1"-update-sets the frame number at that point in time to make it "5" in step S708 and, thereafter confirms in step S709 that the update-set frame number is less than "7".

When the frame number becomes "5", the CPU 21 determines in next step S703 that the frame number is out of the range of "0" to "4" and, returns the frame rate to the setting of the standard value of 30 frames per second (step S711). When the frame rate is 30 frames per second, there is a possibility of a flicker occurring in the display screen during live-view display in the environment of the AC light source driven by the commercial power frequency of 50 Hz.

Furthermore, the CPU 21 confirms in next step S705 that the frame number is not "2" and, selects and sets, in subsequent step S706, a program diagram which maintains the shutter speed 1/50 or 1/60 s during image acquisition as much as possible.

Thereafter, the CPU 21 confirms that the frame number is not "6" to temporarily terminate the processing of FIG. 9, and acquires an image based on the above exposure setting by the processing of steps S313, and S314.

Further, having determined in the seventh processing of FIG. 9 that the part is not at the beginning of the inspection in beginning step S701, the CPU 21 "+1"-update-sets the frame number at that point in time to make it "6" in step S708 and, thereafter confirms in step S709 that the update-set frame number is less than "7".

When the frame number becomes "6", the CPU 21 determines in step S703 that the frame number is out of the range of "0" to "4" and, returns the frame rate in step S711 to the setting of the standard value of 30 frames per second.

Furthermore, the CPU 21 confirms in next step S705 that the frame number is not "2", and selects and sets, in subsequent step S706, a program diagram which maintains the shutter speed 1/50 or 1/60 s during image acquisition as much as possible.

Thereafter, the CPU 21 determines that the frame number is "6", executes comparative evaluation of images to be evaluated which have been acquired before that time, and stored in the buffer memory 14 (step S712) and, thereafter determines whether or not all the comparison conditions are satisfied (step S713).

Evaluation of the images will be described below by using FIG. 10.

Figure 10:
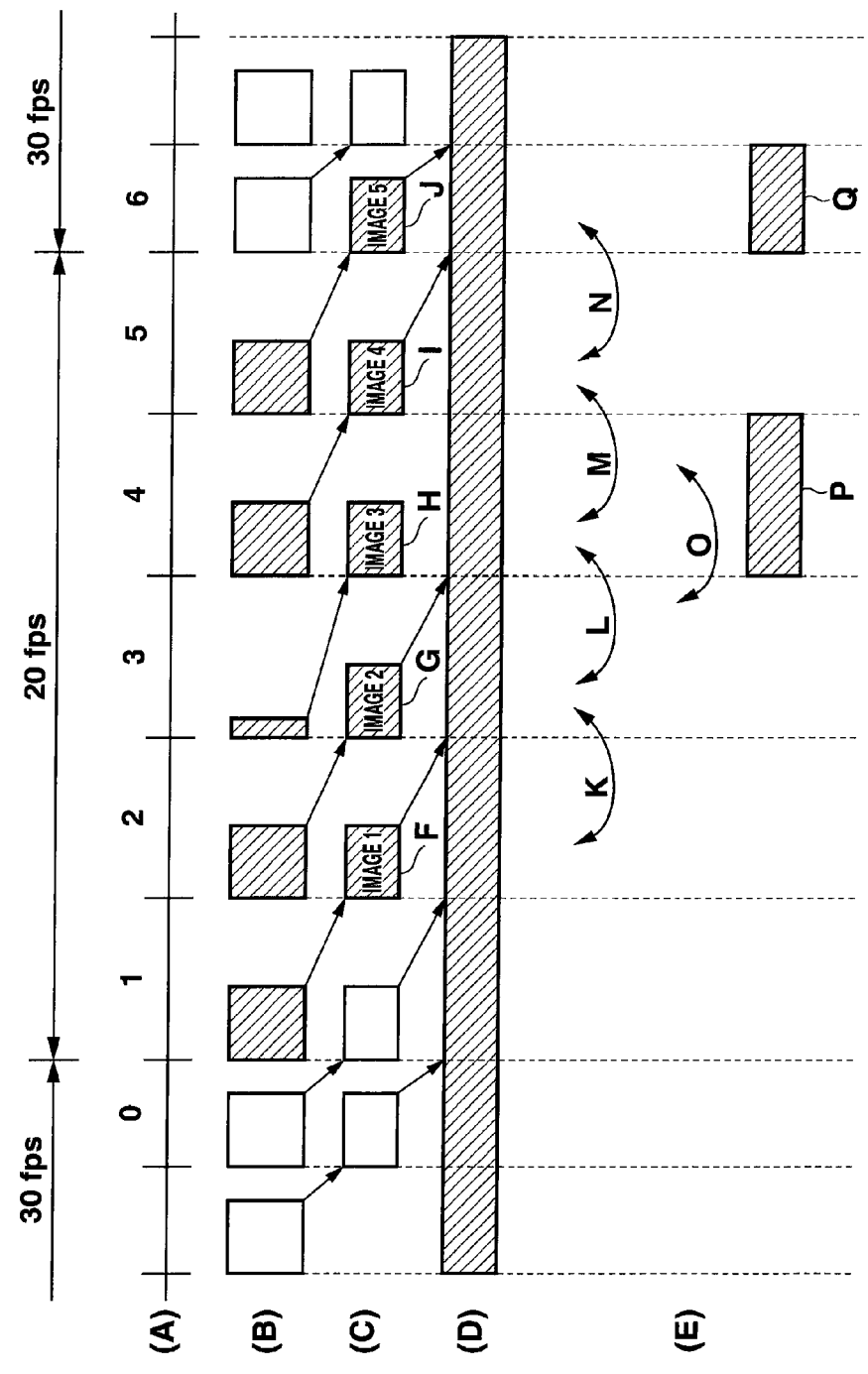
FIG. 10 is a timing chart showing an operation to be carried out during flicker detection processing according to the second embodiment.

In FIG. 10, (A) indicates the frame number to be acquired, (B) indicates the frame period, (C) indicates the image to be evaluated, (D) indicates the timing (time) at which the image to be evaluated is displayed, and (E) indicates a pair of images to be compared on the vertical transfer lines.

First, in (A), an image F to be evaluated at the timing of the frame number "2", and an image G to be evaluated at the timing of the frame number "3" are compared with each other for each identical vertical transfer (V) line (corresponding to K in FIG. 10), and it is confirmed that there is no difference between them.

Figure 11:
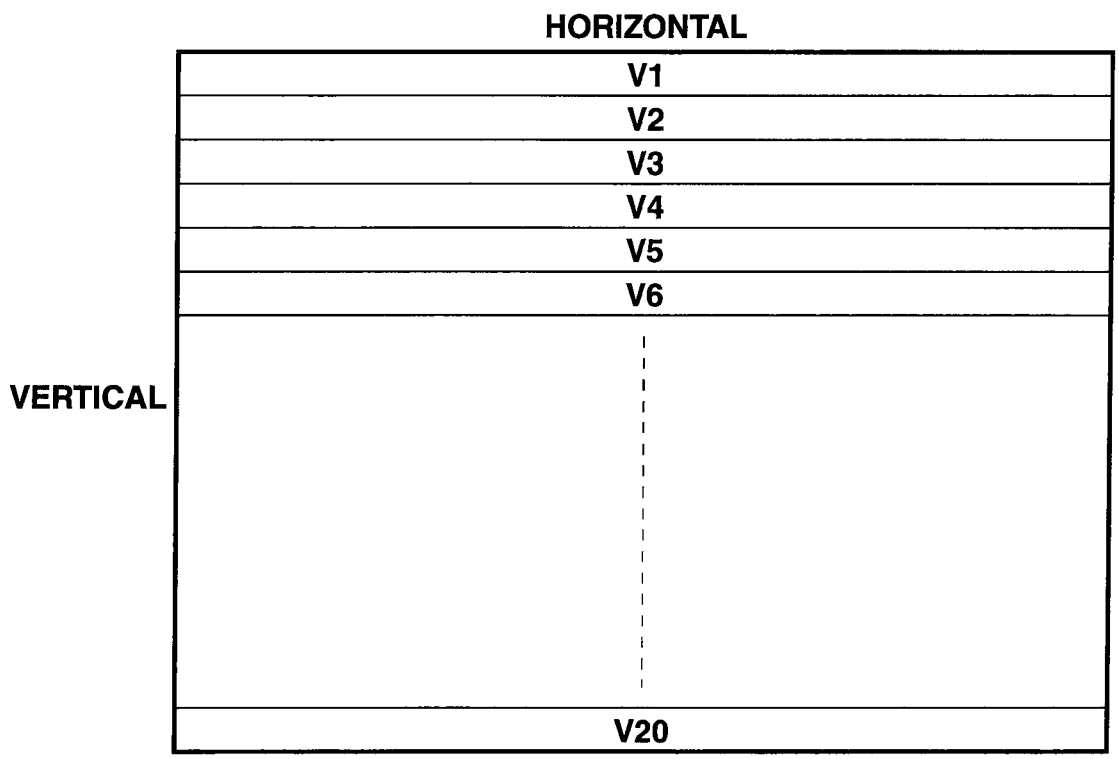
FIG. 11 is a view showing the configuration of an image to be acquired by a CMOS image sensor according to the second embodiment.

FIG. 11 is a view showing the configuration of an image acquired by the CMOS image sensor 12 in a simplifying manner. For the sake of simplification described above, it is assumed that the number of the vertical transfer lines (hereinafter referred to as "V lines") is in total 20 of V1 to V20.

That is, the confirmation at K implies the confirmation that there is no change in brightness based on the flicker at the line position obtained by comparing a change in luminance for each V line between frames, i.e., by comparing the luminance of a V line with the luminance of the V line at the same position in the preceding frame.

Subsequently, in the comparative evaluation of the image G to be evaluated, and image H to be evaluated, it is confirmed that there is a difference greater than a prescribed range between the image G to be evaluated acquired in a flickerless environment, and image H to be evaluated acquired in an environment in which a flicker is caused, and including periodic light and dark on the V line.

Likewise, in the comparative evaluation of the image H to be evaluated, and image I to be evaluated, it is confirmed that there is a difference greater than the prescribed range between the image H to be evaluated acquired in an environment in which a flicker is caused, and including periodic light and dark on the V line, and image I to be evaluated acquired in a flickerless environment.

In the comparative evaluation of the image I to be evaluated, and image J to be evaluated, both of them are images acquired in the flickerless environment, and hence it is confirmed that a change in luminance between them falls within the prescribed range.

Furthermore, it is confirmed whether or not a difference between the change obtained by the comparison L, and change obtained by the comparison M falls within the range prescribed in the comparison O.

When all the confirmation items have been obtained as a result of the comparison between these images, it is expected that a flicker will occur when imaging using the high shutter speed, and hence the occurrence of a flicker is determined in step S713, a flag "1" is set in the flicker environment flag register in the main memory 22 (step S714), the flicker detection is regarded as having been completed, and the processing of FIG. 9 is terminated.

Further, when it is determined that none of all the confirmation items have been obtained as a result of the comparison between the images in step S713, the CPU 21 terminates the flicker detection without carrying out setting of the flicker environment flag in step S714, and terminates the processing of FIG. 9.

As described above, each of the comparison L and comparison M is a comparison made in the state where the frame rate is set to 20 frames per second, and hence the light and dark resulting from the commercial power frequency appear as they are as a change in evaluation value of the V lines V1 to V20, whereby it is possible to specify whether the commercial power frequency is 50 or 60 Hz.

On the basis of the specified commercial power frequency, the CPU 21 selects and sets a program diagram which maintains the shutter speed 1/50 or 1/60 s during image acquisition as much as possible.

Furthermore, in the above comparison O, it is possible to improve the accuracy in specifying the commercial power frequency depending on whether or not a difference between changes falls within the prescribed range.

In the main routine of FIG. 7, having determined that the flicker detection processing has been completed in step S311 during live-view display, the CPU 21 omits execution of the processing of step S312 described in connection with the subroutine of FIG. 9.

Further, when it is determined in step S309 that it is instructed to carry out imaging of a moving image, the CPU 21 omits the processing including flicker detection of steps S310 to S312, and continues imaging of the moving image, monitor display on the display unit 16, and recording of the imaged data on the memory card 31 by repetitively executing the processing of steps S313 and S314.

In this case, although there is a possibility of a flicker having occurred in each static image constituting the moving image, execution of the flicker detection processing is omitted assuming that it is not possible to visually confirm the flicker in a state where the images are successively displayed.

Further, when it is determined in step S305 that it is instructed to carry out imaging of a still image, the CPU 21 reads the contents of the flicker environment flag register set in the main memory 22 (step S306) and, thereafter executes exposure control corresponding to the set contents of single-shot/continuous-shooting (step S307).

FIG. 8 is a flowchart of a subroutine indicating the details of exposure control corresponding to the set contents of single-shot/continuous-shooting of a still image. At the beginning of the subroutine, the CPU 21 carries out exposure operation processing to compute an appropriate exposure value (EV) (step S501).

Subsequently, the CPU 21 determines whether or not a flag "1" is set from the contents of the flicker environment flag register read in step S306 of the main routine (step S502).

Here, when it is determined that the flag "1" is not set as the flicker environment flag, and the state is "0", the CPU 21 selects and reads a normal exposure program diagram in which the flicker is not taken into consideration from the program memory 23, and spreads the read normal exposure program diagram in the main memory 22 (step S504).

Figure 12:
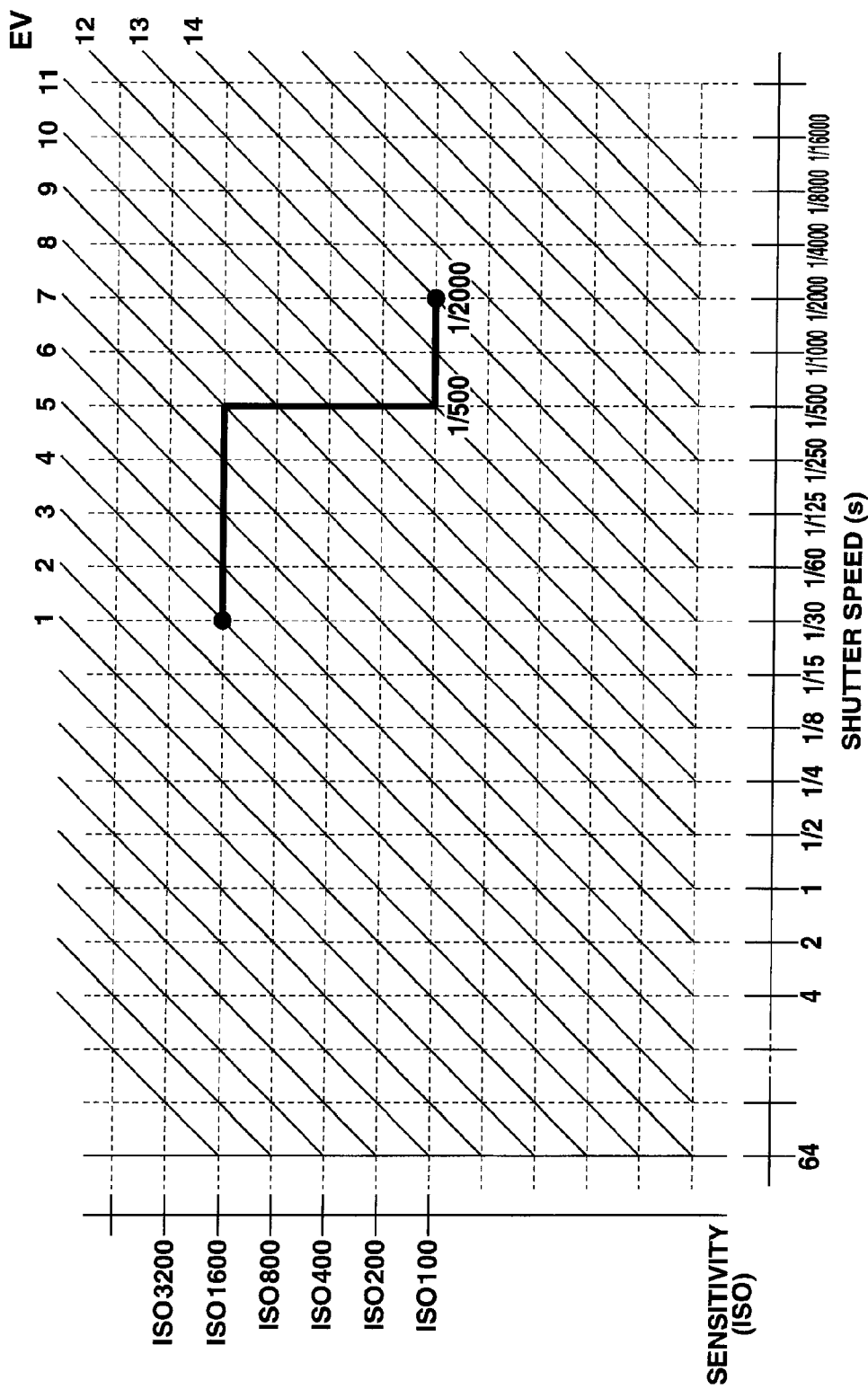
FIG. 12 is a view showing a normal exposure program diagram according to the second embodiment.

FIG. 12 shows the normal exposure program diagram selected and read from the program memory 23 at this time. In FIG. 12, when the F value of the optical lens unit 11 is "2.8", the ISO sensitivity is varied from 1600 to 100 within the range 8 to 12 of the EV value to thereby maintain the high shutter speed of 1/500 s, when the EV value is lower than the above, the shutter speed is set lower and, when the EV value is higher than the above, the shutter speed is set higher.

Further, when it is determined in above step S502 that the flag "1" is set as the flicker environment flag, the CPU 21 selects and reads an exposure program diagram configured to reduce the flicker in consideration of the commercial power frequency from the program memory 23, and spreads the read exposure program diagram in the main memory 22 (step S503).

Figure 13:
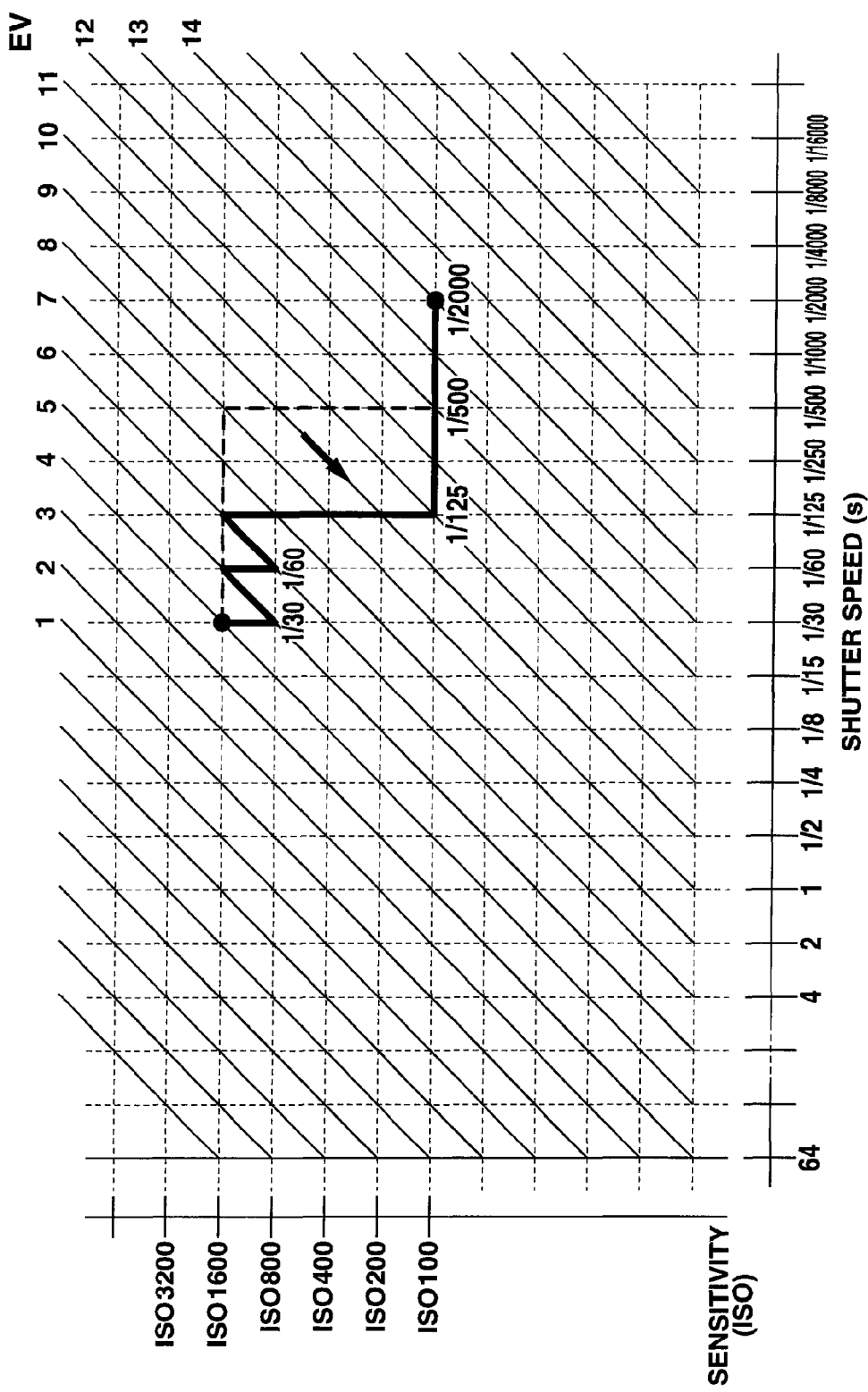
FIG. 13 is a view showing a flicker reduction exposure program diagram according to the second embodiment.

FIG. 13 shows the exposure program diagram for flicker reduction selected and read from the program memory 23 at this time. In FIG. 13, when the commercial power frequency is 60 Hz, and F value of the optical lens unit 11 is 2.8, the ISO sensitivity is varied from 1600 to 800 within the range of 4 to 5 of the EV value to thereby maintain the shutter speed at 1/30 s.

Likewise, the ISO sensitivity is varied from 1600 to 800 within the range of 5 to 6 of the EV value to thereby maintain the shutter speed at 1/60 s. Furthermore, the ISO sensitivity is varied from 1600 to 100 within the range of 6 to 11 of the EV value to thereby maintain the shutter speed at 1/120 s. When the EV value is higher than the above, the ISO sensitivity is set to 100 to thereby set the shutter speed higher.

As described above, by employing a program diagram configured to select, as much as possible, a shutter speed synchronizing with the commercial power frequency which becomes a factor of flicker occurrence, it becomes possible to suppress the occurrence of a flicker to the utmost.

The program diagrams shown in steps S503 and S504 are read, and spread in the main memory 22 and, thereafter the F value, shutter speed, and ISO sensitivity are determined on the basis of the exposure value computed in preceding step S501 (step S505), whereby the subroutine of FIG. 8 is terminated, and the flow is returned to the main routine of FIG. 7.

In the main routine of FIG. 7, imaging processing of a still image is executed on the basis of the exposure value determined in step S307, and a data file of the still image is created and recorded on the memory card 31 (step S308), whereby the series of processing associated with imaging of a still image is terminated, and the flow is returned to the processing from step S304 in order to prepare for the next imaging.

As has been described above in detail, according to this embodiment, during the initial operation of live-view display, a frame rate which securely suppresses the occurrence of a flicker in accordance with the commercial power frequency of 50 or 60 Hz for a certain continuous frame period, i.e., the frame rate of 20 frames per second is realized, an image is acquired at such a high shutter speed that a flicker seems to surely occur in that period and, thereafter it has been made possible to easily detect presence/absence of occurrence of a flicker during a high shutter speed from comparison between the preceding image frame and subsequent image frame.

By employing such a method, it becomes possible to suppress the occurrence of a flicker or the like, and acquire an image of high image quality, particularly when an image is acquired by synthesis based on a plurality of images, and even when a high shutter speed is used, such as a case of a high dynamic range (HDR) image generation in which a panoramic image is generated by continuous-shooting synthesis or an image having a dynamic range enlarged by continuous-shooting synthesis is generated.

Further, in the above method, when the imaging operation in which a so-called rolling shutter is used, and the CMOS image sensor 12 is continuously driven in the line transfer system without jointly using the mechanical shutter, it is possible to efficiently suppress the occurrence of a flicker appearing in the captured image in a form of stripes.

It should be noted that in this embodiment, regarding the timing at which the flicker environment flag is set or reset, although the flicker environment flag is set or reset when starting the imaging mode, the timing is not limited to this and, when a specific imaging condition requiring a high shutter speed is set by a manual operation of the user or by automatically detecting that the imaging environment has changed by means of a sensor or the like configured to detect the surrounding environment, this timing may be used as the timing for resetting.

By employing such a method, it is possible to further improve the convenience.

Besides, the present invention is not limited to the above-mentioned embodiments and, in the implementation stage, can variously be modified within a scope not deviating from the gist of the invention. Further, functions to be executed in the above-mentioned embodiments may be appropriately combined with each other to the utmost, and may be implemented. In the above-mentioned embodiments, various stages are included and, by appropriately combining a plurality of disclosed configuration requirements with each other, various invention items can be extracted. For example, even when some configuration requirements are deleted from all the configuration requirements shown in the embodiments, if any advantage can be obtained, the configuration obtained after the deletion of the configuration requirements can be extracted as invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging apparatus comprising:
    an imaging unit;
    a setting unit configured to select and set one of a plurality of commercial power frequencies;
    a frame rate setting unit configured to set a frame rate corresponding to the commercial power frequency set by the setting unit;
    a control unit configured to control the imaging unit such that imaging is carried out at the frame rate set by the frame rate setting unit to thereby acquire image data successively;
    a detection unit configured to detect a scanning line part at which luminance changes to differ between image data items successively acquired by the control unit;
    a changing unit configured to change the commercial power frequency set by the setting unit in accordance with a detection result obtained by the detection unit;
    an exposure diagram information storage unit configured to store a plurality of types of exposure diagram information items in each of which one period of a respective one of the commercial power frequencies is made a lowest shutter speed; and
    an exposure control unit configured to read exposure diagram information corresponding to the commercial power frequency set by the setting unit from the exposure diagram information storage unit, and control an exposure time of the imaging unit in accordance with the read exposure diagram information to thereby cause the imaging unit to acquire image data,
    wherein the control unit is configured to perform a change of control, from the control of the imaging unit carried out by the exposure control unit, to the control of the imaging unit in which imaging is carried out at the frame rate set by the frame rate setting unit, while acquiring image data successively.

2. The imaging apparatus according to claim 1, further comprising a setting control unit configured to, when the commercial power frequency set by the setting unit is not a standard commercial power frequency, control the frame rate setting unit such that a frame rate corresponding to the standard commercial power frequency is set after an elapse of a predetermined time,
    wherein in the exposure diagram information stored in the exposure diagram information storage unit, information in which one period of the standard commercial power frequency is made the lowest shutter speed is included.

3. The imaging apparatus according to claim 2, wherein the setting control unit sets a frame rate corresponding to the standard commercial power frequency after an elapse of a predetermined time from the time at which an instruction to prepare for recording of the image data to be successively acquired is issued.

4. The imaging apparatus according to claim 1, wherein when the control unit performs the change of control of the imaging unit from the control carried out by the exposure control unit, to the control in which imaging is carried out at the frame rate set by the frame rate setting unit, the detection unit detects a scanning line part at which luminance changes to differ between successively acquired image data items.

5. The imaging apparatus according to claim 1, wherein:
    the exposure diagram information stored in the exposure diagram information storage unit includes specific exposure diagram information including a shutter speed which causes occurrence of a flicker even when a frame rate corresponding to any one of the commercial power frequencies is set by the frame rate setting unit,
    the exposure control unit reads the specific exposure diagram information from the exposure diagram information storage unit, and controls the exposure time of the imaging unit in accordance with the read specific exposure diagram information to thereby cause the imaging unit to acquire image data, in place of the exposure diagram information corresponding to the commercial power frequency set by the setting unit, and
    the frame rate setting unit sets a frame rate synchronizing with the plurality of commercial power frequencies.

6. The imaging apparatus according to claim 5, further comprising:
    an output control unit configured to perform control such that the image data is displayed at a frame rate determined by the exposure control unit.

* * * * *